(12) United States Patent
Zhang et al.

(10) Patent No.: US 11,115,887 B2
(45) Date of Patent: Sep. 7, 2021

(54) BASE STATION, USER EQUIPMENT AND METHOD EXECUTED THEREBY

(71) Applicants: SHARP KABUSHIKI KAISHA, Sakai (JP); FG Innovation Company Limited, Tuen Mun (HK)

(72) Inventors: Chongming Zhang, Shanghai (CN); Shohei Yamada, Sakai (JP); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/346,091

(22) PCT Filed: Nov. 2, 2017

(86) PCT No.: PCT/CN2017/109034
§ 371 (c)(1),
(2) Date: Apr. 29, 2019

(87) PCT Pub. No.: WO2018/082591
PCT Pub. Date: May 11, 2018

(65) Prior Publication Data
US 2019/0297550 A1    Sep. 26, 2019

(30) Foreign Application Priority Data

Nov. 4, 2016   (CN) .......................... 201610974441.0

(51) Int. Cl.
*H04W 36/14*   (2009.01)
*H04W 36/00*   (2009.01)
(52) U.S. Cl.
CPC ....... *H04W 36/14* (2013.01); *H04W 36/0069* (2018.08)

(58) Field of Classification Search
CPC .............................. H04W 48/10; H04W 48/18
(Continued)

(56) References Cited

U.S. PATENT DOCUMENTS

2012/0250601 A1* 10/2012 Choi .................... H04W 88/04
                                                              370/315
2014/0233386 A1   8/2014 Jamadagni et al.
(Continued)

FOREIGN PATENT DOCUMENTS

CN         103987071 A      8/2014
EP           3528550 A1      8/2019

OTHER PUBLICATIONS

NTT Docomo, "New SID Proposal: Study on New Radio Access Technology", RP-160671, 3GPP TSG RAN Meeting #71, Göteborg, Sweden, Mar. 7-10, 2016.
(Continued)

*Primary Examiner* — Kiet M Doan
(74) *Attorney, Agent, or Firm* — ScienBiziP, P.C.

(57) ABSTRACT

The present invention provides a base station, a user equipment (UE) and a method executed by the base station. The method executed by the base station comprises: broadcasting to the UE that the base station supports connectivity to a first core network and a second core network, a communication interface between the first core network and the base station being different from a communication interface between the second core network and the base station; receiving a selection of the UE to one of the first core network and the second core network; and initiating, according to the received selection of the UE, connection establishment to the core network selected by the UE. The technical solution provides a core network selection method for a base station (e.g., eLTE eNB) simultaneously supporting two different core networks, so as to correspondingly determining a network interface used for communication (Continued)

with the selected core network, thereby achieving normal communication between the UE and the core network.

6 Claims, 4 Drawing Sheets

(58) Field of Classification Search
USPC ..... 455/422.1, 448, 450, 436; 370/329, 328, 370/338, 235
See application file for complete search history.

(56) References Cited

U.S. PATENT DOCUMENTS

| | | | |
|---|---|---|---|
| 2015/0009887 A1 | 1/2015 | Chen et al. | |
| 2015/0359026 A1* | 12/2015 | Iwai | H04W 8/183 370/329 |
| 2016/0278110 A1 | 9/2016 | Lee et al. | |
| 2017/0289019 A1* | 10/2017 | Faccin | H04W 36/30 |
| 2018/0146404 A1* | 5/2018 | Zhang | H04W 48/12 |

OTHER PUBLICATIONS

"3rd Generation Partnership Project; Technical Specification Group Services and System Aspects; Study on Architecture for Next Generation System(Release 14)", 3GPP TR 23199 V1.1.0(Oct. 2016).

Qualcomm Incorporated et al., "Way forward on migration from option 3 to NG Core", S2-166106, SA WG2 Meeting #116bis, Oct. 17-21, 2016, Kaohsiung, Taiwan.

LG Electronics et al., "Migration solution with Evolved E-UTRAN to operate EPC and NextGen Core simultaneously", S2-166262, SA WG2 Meeting #117, Oct. 17-21, 2016, Kaohsiung City, Taiwan.

* cited by examiner

BASE STATION, USER EQUIPMENT AND METHOD EXECUTED THEREBY

TECHNICAL FIELD

The present invention relates to the technical field of wireless communications, and more particularly, to a base station, user equipment, and methods executed thereby.

BACKGROUND

With the rapid growth of mobile communication and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another.

At the Third Generation Partnership Project (3GPP) RAN #64 plenary session held in March 2016, a research subject on a new 5G radio access technology was proposed (see non-patent literature: RP-160671 New SID Proposal: Study on New Radio Access Technology). In the description of the work item, the operating frequency band of future new communication systems can be expanded to 100 GHz, which will satisfy requirements of enhanced mobile broadband services, a demand for communication between massive Internet of Things terminals, requirements of services with high reliability requirements, and so on. The research work of the item is expected to end in 2018.

While researching 5G wireless access technologies, the research on core network technologies supporting 5G access is also carried out concurrently. Such core networks can be called as next generation cores. Unlike an existing core network EPC (Evolved Packet Core) connected to an existing LTE (Long Term Evolution) system, the NextGen Core under discussion will be based on different QoS architectures. Therefore, an interface NG-2 between the NextGen Core and 5G wireless access technologies will also be different from an S1 interface between the LTE and the EPC.

In the research on 5G access network technologies, in order to avoid repeated investment of operators, operators are allowed to upgrade deployed LTE base stations such that they can be connected to the NextGen Core. This new type of base station is called as an evolved LTE eNB (evolution of LTE eNB). According to the definition of TR 38.804, the eLTE eNB can support connections to the EPC and the NextGen Core, i.e., support the S1 interface and the NG-2 interface.

The existing LTE base station eNB supports a NAS node selection function (NNSF), which enables the eNB to select an appropriate MME/S-GW for UE when the EPC architecture contains multiple MMEs (Mobility Management Entities)/S-GWs (Serving Gateways). Specifically, the UE provides the eNB with its GUMMEI type (GUMMEI: Globally Unique MME Identity) information, which may be directly contained in an S-TMSI (Serving-Temporary Mobile Subscriber Identity) of the UE or in a GUMMEI type information element. When the GUMMEI type is native, it indicates that the UE is registered with an MME. If the GUMMEI type is mapped, it indicates that the UE is not registered with the MME, but is moved into a coverage of the current LTE eNB due to location movement, and a tracking area needs to be updated again. According to the above information, the eNB can select different MMEs for the UE. No matter which MME is selected, communication between the eNB and the MME is performed via the S1 interface, i.e., the GUMMEI type does not affect a format/protocol stack of signaling interaction between the eNB and the MME.

However, for an eLTE eNB, the above-mentioned NSF function is not enough. When the eLTE eNB is connected to the EPC and the NGNC at the same time, in a process of selecting a core network, the eLTE eNB needs to determine to use which communication interface to communicate with the selected core network. Otherwise, the UE cannot communicate with the core network normally.

Therefore, a novel core network selection technology is needed to solve the above-mentioned problem.

SUMMARY OF INVENTION

In order to solve the above-mentioned problem, embodiments of the present invention provide a base station, user equipment, and methods executed thereby.

According to one solution of the embodiments of the present invention, the present invention provides a method executed by a base station, comprising:
broadcasting to user equipment that the base station supports connectivity to a first core network and a second core network, a communication interface between the first core network and the base station and a communication interface between the second core network and the base station being different;
receiving a selection made by the user equipment of one of the first core network and the second core network; and
initiating, according to the received selection made by the user equipment, setup of a connection to the core network selected by the user equipment.

According to another solution of the present invention, a base station is provided, comprising:
a sending unit, configured to broadcast to user equipment that the base station supports connectivity to a first core network and a second core network, a communication interface between the first core network and the base station and a communication interface between the second core network and the base station being different;
a receiving unit, configured to receive a selection made by the user equipment of one of the first core network and the second core network; and
a connection setup unit, configured to initiate, according to the received selection made by the user equipment, setup of a connection to the core network selected by the user equipment.

According to another solution of the embodiments of the present invention, a method executed by user equipment is provided, comprising:
receiving information broadcast by a base station and indicating that the base station supports connectivity to a first core network and a second core network;
selecting one of the first core network and the second core network as a core network to be accessed; and
sending to the base station the selection of the core network to be accessed.

According to yet another solution of the embodiments of the present invention, user equipment is provided, comprising:
a receiving unit, configured to receive information broadcast by a base station and indicating that the base station supports connectivity to a first core network and a second core network;

an access network selection unit, configured to select one of the first core network and the second core network as a core network to be accessed; and a sending unit, configured to send to the base station the selection of the core network to be accessed.

The above technical solutions of the present invention provide a method for a base station (e.g., an eLTE eNB) supporting two different core networks at the same time to select a core network, and further accordingly determine a network interface to be used to communicate with the selected core network, realizing normal communication between UE and the core network.

BRIEF DESCRIPTION OF DRAWINGS

The above and other features of the present disclosure will become more apparent with the following detailed description in conjunction with the accompanying drawings.

DETAILED DESCRIPTION OF EMBODIMENTS

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Figure 1:
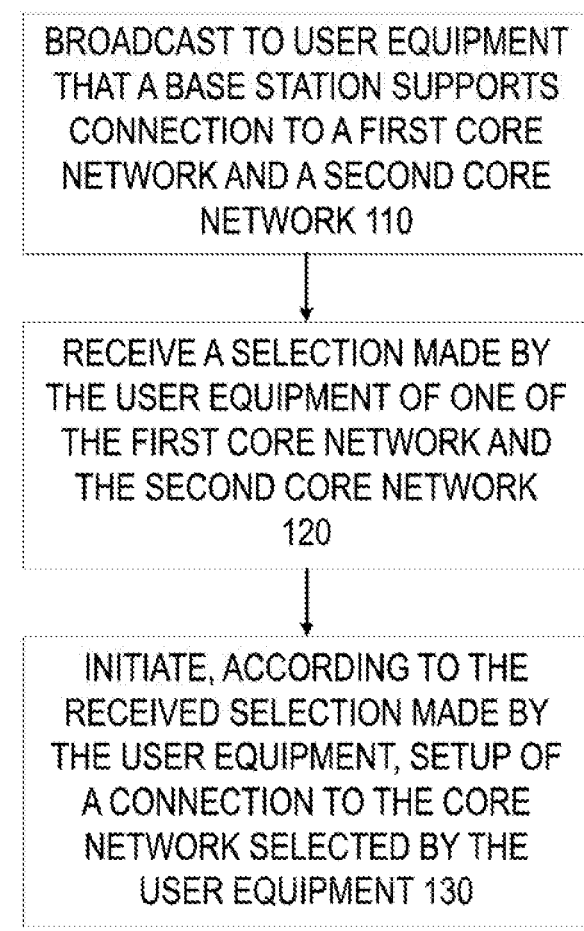
FIG. 1 illustrates a brief flowchart of a method executed by a base station according to an embodiment of the present invention.

The embodiment of the present invention provides a method executed by a base station. FIG. 1 illustrates a brief flowchart of this method. As illustrated in FIG. 1, the method comprises the following steps:

Step S110: Broadcast to user equipment that the base station supports connectivity to a first core network and a second core network.

Step S120: Receive a selection made by the user equipment of one of the first core network and the second core network.

Step S130: Initiate, according to the received selection made by the user equipment, setup of a connection to the core network selected by the user equipment.

In some examples, the method may further comprise: when the core network selected by the user equipment is judged to be unsuitable for providing a service to the user equipment:

refusing the connection of the user equipment to the selected core network; and/or instructing the user equipment to decrease a connection priority of the selected core network over a period of time to prevent the user equipment from connecting to the selected core network over the period of time.

In some examples, the method may further comprise: after the connection to the core network selected by the user equipment has been set up, if the core network selected by the user equipment is judged to be unsuitable for continuing providing a service to the user equipment:

sending a switching request to the core network selected by the user equipment, to request for switching the user equipment to the unselected core network in the first core network and the second core network; and receiving a first handover command from the core network selected by the user equipment, and sending a second handover command to the user equipment to instruct the user equipment to switch to the unselected core network in the first core network and the second core network. The first handover command and the second handover command herein may be the same, in which case the base station only needs to forward the handover command received from the core network, or they may be different, in which case the base station may also generate a new handover command according to the handover command received from the core network. The present invention is not limited thereto.

In some examples, information sent to the user equipment is an explicit indication or an implicit indication for a core network supported by the base station.

For example, the explicit indication may be a specific bit value. For example, it indicates that a NextGen Core (or an EPC) is supported when a bit for the NextGen Core (or the EPC) is set to 1; otherwise, it indicates that the NextGen Core (or the EPC) is not supported; and when the bit for the NextGen Core and the bit for the EPC are both set to 1, it explicitly indicates that the base station of a current cell supports connectivity to the two types of core networks. For example, the implicit indication may be related information about the supported core network broadcast in the cell. For example, if both NextGen Core location area information and EPC tracking area information are broadcast, it implicitly indicates that the base station of the current cell supports connectivity to the two types of the core networks. Certainly, the above-mentioned examples are only some examples of indications applicable to the present invention. The present invention is not limited thereto, but may adopt any means that can be used as indications in the field.

In some examples, the selection made by the user equipment of the core network may be directly received by the base station from one of an RRC connection request message, an RRC connection re-establishment message, an uplink common control channel message, and an RRC connection setup complete message.

In other examples, the selection made by the user equipment of the core network may be implied in registration information or the type of the registration information or a core network identity of the user equipment received from the user equipment. In this situation, the method illustrated in FIG. 1 may further comprises: deducing a core network with which the user equipment is registered from the registration information or the type of the registration information or the core network identity of the user equipment, wherein the core network with which the user equipment is registered is one of the first core network and the second core network; and determining the core network with which the user equipment is registered as the core network selected by the user equipment.

In the above method, the first core network may be one of a next generation core (NextGen Core) network and an evolved packet core (EPC) network, and the second core network may be the other of the next generation core network and the evolved packet core network. However, it is easy for one skilled in the art to understand that the technical solution of the present invention may also be applied to selection of core networks by any other base stations supporting two different types of core networks at the same time, rather than being limited to an eLTE eNB supporting a NextGen Core and an EPC as mentioned in the specific implementation of the embodiment of the present invention below.

Figure 2:
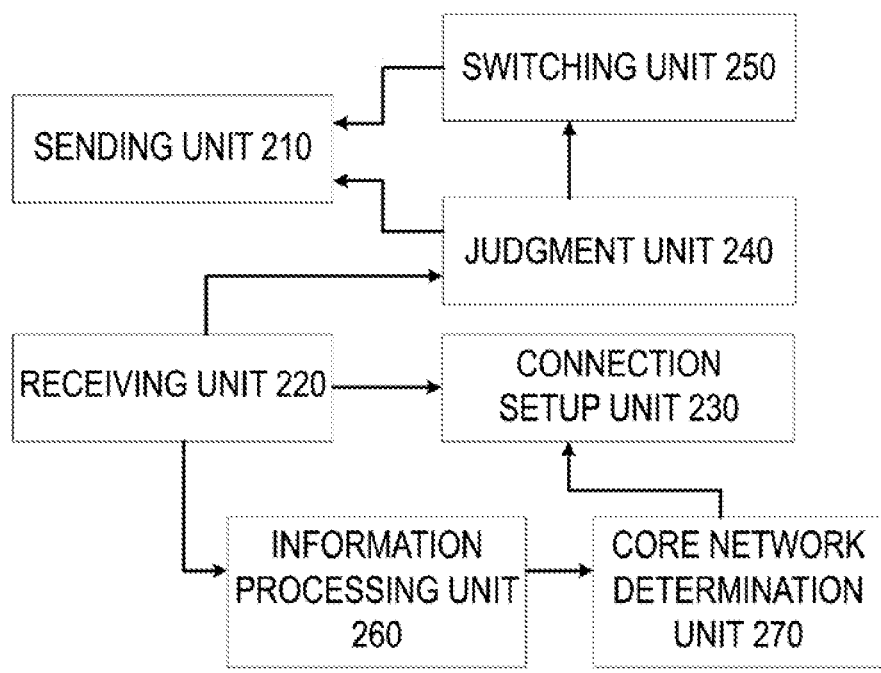
FIG. 2 illustrates a brief block diagram of a base station according to an embodiment of the present invention.

FIG. 2 illustrates a base station corresponding to the method illustrated in FIG. 1. As illustrated in FIG. 2, the base station comprises:

a sending unit 210, configured to broadcast to user equipment that the base station supports connectivity to a first core network and a second core network;

a receiving unit 220, configured to receive a selection made by the user equipment of one of the first core network and the second core network; and a connection setup unit 230, configured to initiate, according to the received selection made by the user equipment, setup of a connection to the core network selected by the user equipment.

In some examples, the base station may further comprise a judgment unit 240, configured to judge whether the core network selected by the user equipment is suitable for providing a service to the user equipment, and when the core network selected by the user equipment is judged to be unsuitable for providing a service to the user equipment, perform, via the sending unit 210, operations of:

refusing the connection of the user equipment to the selected core network; and/or instructing the user equipment to decrease a connection priority of the selected core network over a period of time to prevent the user equipment from connecting to the selected core network over the period of time.

In some examples, the base station may further comprise a handover unit 250, configured to: after the connection to the core network selected by the user equipment has been set up, if the judgment unit 240 judges that the core network selected by the user equipment is unsuitable for continuing providing a service to the user equipment, perform, via the sending unit 210, operations of:

sending a handover request to the core network selected by the user equipment to request for switching the user equipment to the unselected core network in the first core network and the second core network; and after receiving a first handover command from the core network selected by the user equipment, sending a second handover command to the user equipment to instruct the user equipment to switch to the unselected core network in the first core network and the second core network.

A described above, the first handover command and the second handover command here may be the same or different.

In some examples, information sent to the user equipment is an explicit indication or an implicit indication for a core network supported by the base station.

In some examples, the selection made by the user equipment of the core network may be directly received from one of an RRC connection request message, an RRC connection re-establishment message, an uplink common control channel message, and an RRC connection setup complete message.

In some examples, the selection made by the user equipment of the core network may be implied in registration information or the type of the registration information or a core network identity of the user equipment received from the user equipment. In this situation, the base station may further comprises an information processing unit 260, configured to deduce a core network with which the user equipment is registered from the registration information or the type of the registration information or the core network identity of the user equipment, wherein the core network with which the user equipment is registered is one of the first core network and the second core network; and a core network determination unit 270, configured to determine the core network with which the user equipment is registered as the core network selected by the user equipment.

In some examples, the first core network may be one of a next generation core network and an evolved packet core network, and the second core network may be the other of the next generation core network and the evolved packet core network. As described above, the first core network and the second core network may also be any other types of core networks that can be supported by the same base station at the same time.

Figure 3:
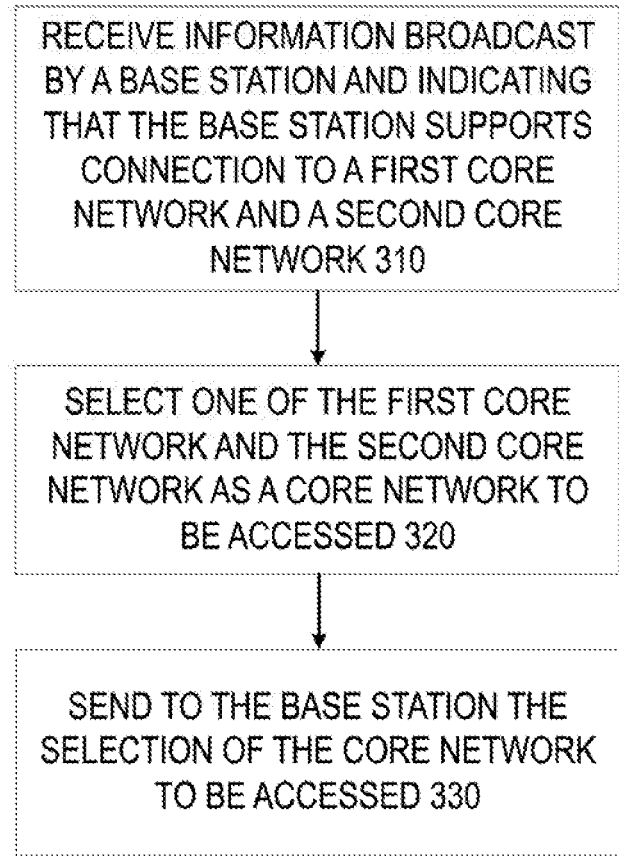
FIG. 3 illustrates a brief flowchart of a method executed by user equipment according to an embodiment of the present invention.

FIG. 3 illustrates a brief flowchart of a method executed by user equipment. As illustrated in FIG. 3, the method comprises the following steps:

Step 310: Receive information broadcast by a base station and indicating that the base station supports connectivity to a first core network and a second core network.

Step 320: Select one of the first core network and the second core network as a core network to be accessed.

Step 330: Send to the base station the selection of the core network to be accessed.

In some examples, the method may further comprise:

receiving from the base station an instruction of refusing the user equipment to connect to the selected core network and/or instructing the user equipment to decrease a connection priority of the selected core network over a period of time;

reselecting, according to the instruction, the unselected core network in the first core network and the second core network as the core network to be accessed; and decreasing the connection priority of the previously selected core network over the period of time.

In some examples, the method may further comprise:

receiving a handover command sent by the base station; and switching to the unselected core network in the first core network and the second core network according to the handover command.

In some examples, information received from the base station may be an explicit indication or an implicit indication for a core network supported by the base station.

In some examples, the selection of the core network may be directly sent in one of an RRC connection request message, an RRC connection re-establishment message, an uplink common control channel message, and an RRC connection setup complete message.

In other examples, the selection of the core network may be implied in registration information or the type of the registration information or a core network identity of the user equipment sent to the base station, such that the base station determines, according to the registration information or the type of the registration information or the core network identity, the core network selected by the user equipment.

In some examples, the first core network may be one of a next generation core network and an evolved packet core network, and the second core network may be the other of the next generation core network and the evolved packet core network.

Figure 4:
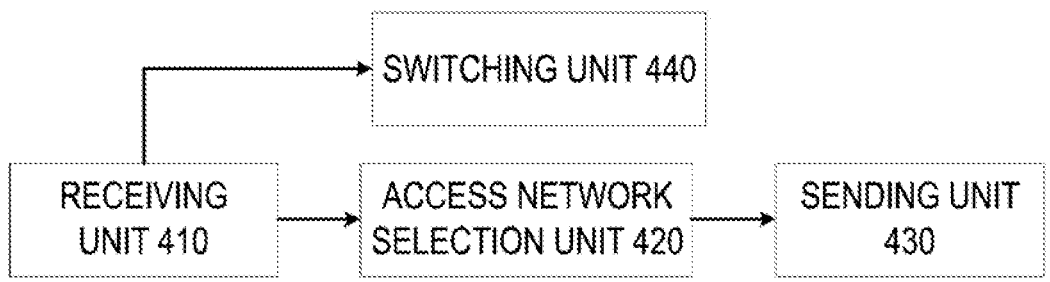
FIG. 4 illustrates a brief block diagram of user equipment according to an embodiment of the present invention.

FIG. 4 illustrates a brief diagram of user equipment for implementing the method illustrated in FIG. 3. As illustrated in FIG. 4, the user equipment comprises:

a receiving unit 410, configured to receive information broadcast by a base station and indicating that the base station supports connectivity to a first core network and a second core network;

an access network selection unit 420, configured to select one of the first core network and the second core network as a core network to be accessed; and a sending unit 430, configured to send to the base station the selection of the core network to be accessed.

In some examples, the receiving unit 410 may be further configured to receive from the base station an instruction of refusing the user equipment to connect to the selected core network and/or instructing the user equipment to decrease a connection priority of the selected core network over a period of time. The access network selection unit 420 may be further configured to reselect, according to the instruction, the unselected core network in the first core network and the second core network as the core network to be accessed, and decrease the connection priority of the previously selected core network over the period of time.

In some examples, the receiving unit 410 is further configured to receive a handover command sent by the base station. In this situation, the user equipment further comprises a switching unit 440, configured to switch to the unselected core network in the first core network and the second core network according to the handover command.

In some examples, information received from the base station may be an explicit indication or an implicit indication for a core network supported by the base station.

In some examples, the selection of the core network may be directly sent in one of an RRC connection request message, an RRC connection re-establishment message, an uplink common control channel message, and an RRC connection setup complete message; or the selection of the core network may be implied in registration information or the type of the registration information or a core network identity of the user equipment sent to the base station, such that the base station determines, according to the registration information or the type of the registration information or the core network identity, the core network selected by the user equipment.

In some examples, the first core network may be one of a next generation core network and an evolved packet core network, and the second core network may be the other of the next generation core network and the evolved packet core network.

It needs be noted that, although exemplary simplified block diagrams of the base station and the user equipment according to the embodiments of the present invention are illustrated in FIG. 2 and FIG. 4 in the form of modules/units, the methods described in the present invention may also be executed in a processing device (e.g., a central processing unit (CPU) or any other suitable processing devices). For example, program instructions for executing the method of the present invention may be stored in a memory and executed by the processing device.

The technical solutions of specific embodiments of the present invention will be described below with reference to the drawings. It needs to be noted again that the first core network may be one of a next generation core (NextGen Core) network and an evolved packet core (EPC) network, and the second core network may be the other of the next generation core network and the evolved packet core network. However, it is easy for one skilled in the art to understand that the technical solution of the present invention may also be applied to selection of core networks by any other base stations supporting two different types of core networks at the same time, rather than being limited to an eLTE eNB supporting a NextGen Core and an EPC as mentioned in the specific implementation of the embodiment of the present invention below.

Embodiment 1

The sending unit 210 of the base station broadcasts system information in a cell covered thereby, indicating that the current LTE cell supports connectivity to a NextGen Core and connection to an EPC. This indication about connection may be an explicit indication, e.g., by using a specific bit, when the bit is set to 1, it indicates that a network core is supported; otherwise, it indicates that the network core is not supported; or an implicit indication may be used, e.g., related information about a NextGen Core such as a location area of the NextGen Core and a timer configuration of the NextGen Core, is broadcast in the current cell to indirectly indicate that connection to the NextGen Core is supported; otherwise, when there is no such related information about the NextGen Core, it indicates that connection to the NextGen Core is not supported. Similarly, the above method may also be used to indicate connection to an EPC.

When the receiving unit 410 of the UE receives the system information, when a connection needs to be established, a RRC connection request message or RRC connection re-establishment message is sent to the base station via the sending unit 430 (since both of the messages are a third message in setup and re-setup processes of an RRC (Radio Resource Control) connection of LTE, they may be collectively called as message 3, Msg3). Msg3 carries information to instruct to set up a connection to the NextGen Core.

The instruction information may be a new message type added to a massage transmitted over an uplink common control channel (UL-CCCH-Message), which instructs to establish a connection to the NextGen Core. When the user terminal initiates a connection establishment request with such a message, it indicates that the user terminal selects the NextGen Core to set up a connection.

Alternatively, the UE may instruct the base station to establish a connection to the NextGen Core in an RRCConnectionSetupComplete message (which is the fifth message during an RRC connection setup process of LTE, called as Msg5).

The instruction information may be carried in a new information element, instructing to establish a connection to the NextGen Core. If the information element is not used, it indicates that no connection to the NextGen Core is to be established or a connection to the EPC is to be established.

Alternatively, an identity of the UE in the core network may be contained in MSg5, referred to as a core network identity, such as an S-TMSI. According to the core network identity of the UE, a core network to which the UE belongs can be deduced, thus indicating a core network to which a connection is to be established.

According to the indication, the base station uses a core network interface (NG-2 or S1) corresponding to the indication to route non-access layer information sent by the UE to the corresponding core network (the NextGen Core or the EPC) to complete the selection of the core network. For example, if the UE instructs to establish a connection to the NextGen Core, the base station will send the non-access layer information obtained from the UE to the NextGen Core through the NG-2 interface. If the UE does not instruct to establish a connection to the NextGen Core, the base station may send the non-access layer information obtained from the UE to the EPC through the S1 interface. In some implementations, if the UE does not instruct to establish a connection to the NextGen Core, the base station may also judge, before sending information to the core network, whether the UE instructs to establish a connection to the EPC.

Embodiment 2

On the basis of embodiment 1, the UE may help the base station complete the selection of the core network by providing the base station with information about a core network with which the UE is registered or the type of the registration information. For example, an existing gummei type is extended to 2 bits, wherein 00: the GUMMEI included is native (i.e., NextGen), which indicates that the UE is registered with a NextGen Core network;

01: the GUMMEI included is mapped (from 2G/3G identifiers), which indicates that the UE is registered with a 2G/3G network;

10: the GUMMEI included is mapped (from EPC identifiers), which indicates that the UE is registered with an EPC;

11: reserved

In situation 1, the base station can send the request of the UE to the NextGen Core.

In situation 2, the base station can make a judgment according to load conditions of the NGNC and the EPC or other corresponding conditions, and send the request of the UE to the NextGen Core or the EPC.

In situation 3, the base station can send the request of the UE to the EPC.

Embodiment 3

On the basis of embodiment 1, when the UE requests to connect to the NextGen Core, if the NextGen Core is unsuitable for providing a service to the UE due to excessive network load or other reasons, the base station can send a connection refused message to the UE. The process specifically comprises:

the base station receiving the connection setup request of the UE for connecting to the NextGen Core in MSg3; and the base station refusing the connection setup request of the UE in MSg4. Alternatively, in the connection refused message, the base station may instruct the UE to decrease a priority of the selected core network (e.g., the NextGen Core) over a period of time, so as to prevent the UE from continuously requesting for connecting to the selected core network over the period of time.

The above-mentioned solution may also be applied to refusal of a connection to the EPC. For example, as shown in the following example:

The base station receives a connection setup request of the UE in MSg3, which does not indicate connection to the NextGen Core. In the situation of implicit indication, the request means instructing to connect to the EPC;

the base station refuses the connection setup request of the UE in MSg4. Alternatively, in the connection refused message, the base station may instruct the UE to decrease the priority of the selected core network, i.e., the EPC, over a period of time, so as to prevent the UE form requesting for accessing the core network.

After receiving the connection refused message from the base station, the UE can request for connecting to the other unselected core network, for example, request for connecting to the EPC after the request for connecting to the NextGen Core is refused, or vice versa.

Embodiment 4

On the basis of embodiments 1-3, after the UE is connected to the NextGen Core, when the NextGen Core is unsuitable for providing a service to the UE, for example, because of network congestion or overload, the base station may switch the core network to which the UE is connected, which may specifically comprise:

the base station initiating a handover request to the NextGen Core to request for handover the UE to the EPC;

the base station receiving a handover command from the NextGen Core that instructs to handover the UE to the EPC;

the base station forwarding the handover command to the UE, which indicates that the UE has been switched across core networks in a target cell, i.e., the current cell. According to the instruction, the UE establishes a connection to the target core network on the current air interface connection. Specifically, the UE does not need to re-initiate an access request, but sends data and signaling to the EPC on a radio bearer that has been set up. Alternatively, the handover command may be an RRC reconfiguration message, and UE may send and receive data and signaling to/from the target core network EPC on the reconfigured radio bearer.

The program running on the device according to the present invention may be a program that enables the computer to implement the functions of the embodiments of the present invention by controlling the central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A method executed by a user equipment, comprising:
receiving system information, broadcasted by a base station, indicating whether the
base station supports connectivity to a Next Generation Core and an Evolved Packet Core (EPC);
in a case that the system information indicates that the base station supports connectivity to both the Next Generation Core and the EPC,
in a case that the user equipment selects the Next Generation Core,
transmitting an information element in a Radio Resource Control (RRC) Connection Request message, the information element indicating the Next Generation Core as a core network to be accessed after transmitting the RRC connection request message and an identity of the user equipment in the Next Generation Core, and
receiving, from the base station, an RRC Reconfiguration message with an indication indicating the core network is switched from the Next Generation Core to the EPC for hand over,
in a case that the user equipment selects the EPC,
not transmitting the information element in the RRC Connection Request message, and
receiving, from the base station, the RRC Reconfiguration message with the indication indicating the core network is switched from the EPC to the Next Generation Core for hand over.

2. A user equipment comprising:
receiving circuitry configured to receive system information, broadcasted by a base station, indicating whether the base station supports connectivity to a Next Generation Core and an Evolved Packet Core (EPC);
in a case that the system information indicates that the base station supports connectivity to both the Next Generation Core and the EPC,
in a case that the user equipment selects the Next Generation Core,
transmitting circuitry transmits an information element in a Radio Resource Control (RRC) Connection Request message, the information element indicating the Next Generation Core as a core network to be accessed after transmitting the RRC connection request message and an identity of the user equipment in the Next Generation Core, and
receiving circuitry receives, from the base station, an RRC Reconfiguration message with an indication indicating the core network is switched from the Next Generation Core to the EPC for hand over,
in a case that the user equipment selects the EPC,
the transmitting circuitry does not transmit the information element in the RRC Connection Request message, and
the receiving circuitry receives, from the base station, the RRC Reconfiguration message with the indication indicating the core network is switched from EPC to the Next Generation Core for hand over.

3. The user equipment according to claim 2, wherein the Next Generation Core includes a 5GC.

4. A method executed by a base station, comprising:
transmitting system information indicating whether the base station supports connectivity to a Next Generation Core and an Evolved Packet Core (EPC); and
receiving an information element in a Radio Resource Control (RRC) Connection Request message,
wherein in a case that the system information indicates that the base station supports connectivity to both the Next Generation Core and the EPC,
in a case of receiving the information element in the RRC Connection Request message, the information element indicating the Next Generation Core as a core network to be accessed after transmitting the RRC connection request message and an identity of the user equipment in the Next Generation Core,
connecting to the Next Generation Core, and
transmitting an RRC Reconfiguration message with an indication indicating the core network is switched from the Next Generation Core to the EPC for hand over,
in a case of not receiving the information element in the RRC Connection Request message,
connecting to the EPC, and
transmitting the RRC Reconfiguration message with an indication indicating the core network is switched from EPC to the Next Generation Core for hand over.

5. A base station comprising:
transmitting circuitry configured to transmit system information indicating whether the base station supports connectivity to a Next Generation Core and an Evolved Packet Core (EPC); and
receiving circuitry configured to receive an information element in a Radio Resource Control (RRC) Connection Request message,
wherein in a case that the system information indicates that the base station supports connectivity to both the Next Generation Core and the EPC,
in a case that the receiving circuitry receives the information element in the RRC Connection Request message, the information element indicating the Next Generation Core as a core network to be accessed after transmitting the RRC connection request message and an identity of the user equipment in the Next Generation Core,
connecting circuitry connects to the Next Generation Core, and
the transmitting circuitry transmits an RRC Reconfiguration message with an indication indicating the core network is switched from the Next Generation Core to the EPC for hand over,
in a case that the receiving circuitry does not receive the information element,
the connecting circuitry connects to the EPC, and the transmitting circuitry transmits the RRC Reconfiguration message with the indication indicating the core network is switched from EPC to the Next Generation Core for hand over.

6. The base station according to claim 5, wherein the Next Generation Core includes a 5GC.

\* \* \* \* \*